United States Patent
Chen et al.

(10) Patent No.: US 6,453,413 B1
(45) Date of Patent: Sep. 17, 2002

(54) METHOD FOR PRE-INSTALLING SOFTWARE PROGRAMS WHICH ALLOWS CUSTOMIZABLE COMBINATIONS OF CONFIGURATIONS

(75) Inventors: Hsuan-Tung Chen; Kuang-Hsin Lin, both of Taipei (TW); Hung-Feng Chao; Hao-Feng Kou, both of Tianjin (CN)

(73) Assignee: Inventec Corp., Taipei (TW)

( * ) Notice: Subject to any disclaimer, the term of this patent is extended or adjusted under 35 U.S.C. 154(b) by 0 days.

(21) Appl. No.: 09/280,895

(22) Filed: Mar. 29, 1999

(51) Int. Cl.[7] .............................................. G06F 9/445
(52) U.S. Cl. .......................... 713/2; 713/1; 709/221; 710/10; 711/202
(58) Field of Search ............................. 713/1, 2, 100; 709/222, 220, 221; 710/8, 9, 10, 61; 714/21, 47; 711/202, 206

(56) References Cited

U.S. PATENT DOCUMENTS

| | | | | |
|---|---|---|---|---|
| 5,367,686 A | * | 11/1994 | Fisher et al. ................. | 395/700 |
| 5,394,522 A | * | 2/1995 | Sanchez-Frank et al. ... | 395/159 |
| 5,715,456 A | * | 2/1998 | Bennett et al. ................. | 713/2 |
| 5,835,760 A | * | 11/1998 | Harmer ........................... | 713/2 |
| 6,098,097 A | * | 8/2000 | Dean et al. .................... | 709/220 |
| 6,247,128 B1 | * | 6/2001 | Fisher et al. ................. | 713/100 |
| 6,262,726 B1 | * | 7/2001 | Stedman et al. ............. | 345/333 |
| 6,308,288 B1 | * | 10/2001 | Chang et al. .................. | 714/38 |

* cited by examiner

Primary Examiner—Jeffrey Gaffin
Assistant Examiner—Rijue Mai
(74) Attorney, Agent, or Firm—W. Wayne Liauh

(57) ABSTRACT

The invention relates to a method for pre-installing software program. First create a configuration file according to the demand of software programs in each destination disk drive. Then the server of a local area network creates an operating system image file and an application file package. The files are sent to the local area network station to pre-install the software. Using the method, the pre-installation of software program can be realized. Also, the user may select the programs freely without partitioning and formatting the hard disk. At the same time, the installation of software can be done in a large number of new machines automatically.

9 Claims, 6 Drawing Sheets

METHOD FOR PRE-INSTALLING SOFTWARE PROGRAMS WHICH ALLOWS CUSTOMIZABLE COMBINATIONS OF CONFIGURATIONS

BACKGROUND OF THE INVENTION

The present invention relates to a method for pre-installing software programs, especially to a method for pre-installing software programs that may pre-install different combinatorial software programs by making the image files of operating systems and then making application software programs into file packages.

Computer manufacturers usually have to install the software programs in the hard disks of computers according to the clients' requirements. There are two well-known methods for the installation.

One is to format the hard disk. First, create the partitions and format every partition thereof. Then install the operating system and further install other software programs. The main disadvantage of the method is time-consuming. Using this method, installing software programs requires formatting the hard disk in advance. It is not an efficient way for computer manufacturers when a large number of new computers need to be pre-installed.

The other method is to create the image file of the hard disk drive. Using the method, all the required software programs are first installed on a source disk drive. Then the data stored in every sector of the source disk are replicated to the corresponding sector on a destination disk drive. In other words, using the source disk drive as the type, the data can be replicated on the destination disk drive, which makes the destination disk identical with the source drive. For example, if the data in sector A on the source drive is "0011", the data in sector A on the destination drive after imaging will be also "0011". By the method, the status of the source drive can be duplicated unchangeably to the destination drive. Moreover, because the source drive has been formatted and the software programs have been installed initially, the destination drive, after duplicating the image files, is also formatted, and the software programs installation is also finished. This method not only reduces the work of disk format but also attains better efficiency.

Although the method of creating the image file is a more efficient way, there are a few drawbacks. Each operating system or application software program corresponds to a fixed image file; hence, when the client wants a different combination of operating systems and application programs, the image file on the source drive need to be changed. If there are two operating systems such as Windows 95 and Windows 98 and three application programs such as Microsoft Office 97, Internet Explorer and Outlook Express, there are 2×7=14 different way to install one operating system and one application program on the computer. Therefore, using the method and technology, it is required to create many different image files because of the variety of client's requirements.

SUMMARY OF THE INVENTION

The objective of the invention is to supply a method for pre-installing software programs, by which one may make the different combinations of configuration according to the different requirements of the clients. Using the method, the user may freely select installing different operating systems and different application software programs.

The other objective of the invention is to supply a method of software installation, by which formatting the partition of the hard disk are no more needed before installing the software programs on a large number of new computers.

Accordingly, first an allocation table document is made in response to the requirement of each destination drive. Then an operating system (OS) image file and an application program (APP) file package is created according to the content of the allocation table document. During the installation, the OS image file which has been made is copied to the destination disk, by which the install of operating system and the formatting of the hard disk are finished. Then the APP file package is copied to the destination disk drive. After all, register each application program separately. On the other words, the invention combines the two known methods for software pre-installing.

Using the image file method, the formatting work of hard disk drive and installations of software programs can be done at the same time. It is an efficient way; however, there is somewhat trade off between the time and the system resource. Because of the possibilities of different combinations of various operating systems and application programs, the image file method uses up excess system resources. In the present invention, the number of image files is reduced because only the OS image file is created. The application programs are stored in the file packages on the destination disk drive as usual. Therefore, different methods are adopted for installing the operating systems and application programs. In addition, the objective to automatically pre-install can be achieved by using a configuration file (Config.ini) to setup the required software programs on each destination disk drive and connecting to the local area network (LAN).

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE PREFERRED EMBODIMENTS

Figure 1:
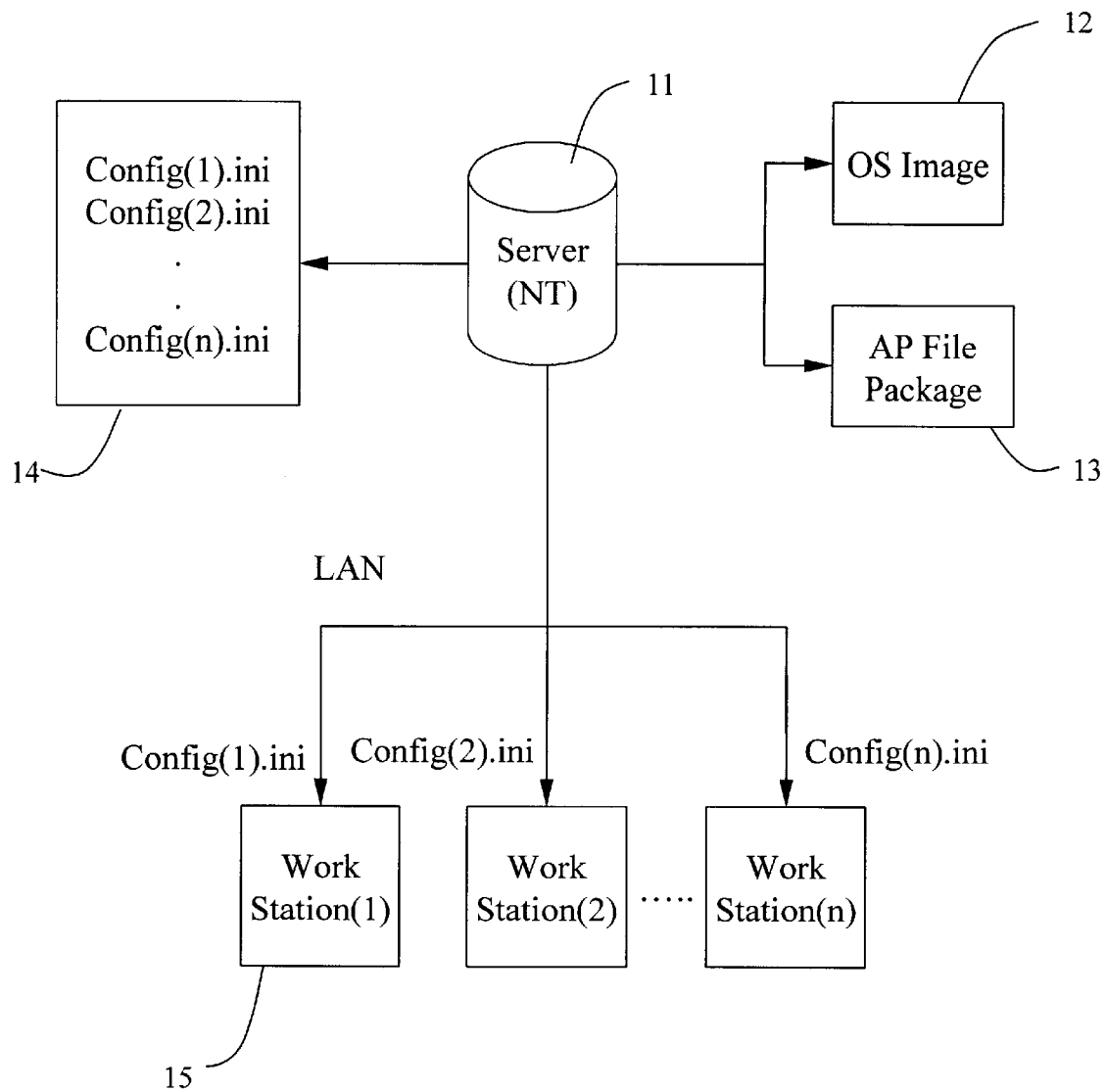
FIG. 1 is a basic organization diagram of the method for pre-installing software programs.

The basic organization of the invention is illustrated in the FIG. 1 which illustrates a local area network 10 that can automatically pre-install software programs. In the server 11, there are OS image files 12 and APP file packages 13. There are also configuration files (Config.ini) 14 for each workstation 15 in the network. The configuration files 14 include data about the types of hardware, corresponding types of software, and the path for installation. During the pre-installation, the server 11 will transmit the selected OS image file 12 and APP file package 13 to the destination workstation 15 to pre-install the operating systems and application programs. As the result, the configuration file 14 is regarded as the menu of each workstation 15. The server transmits the selection (the application programs) to the client (the workstation according to the menu.

Figure 2:
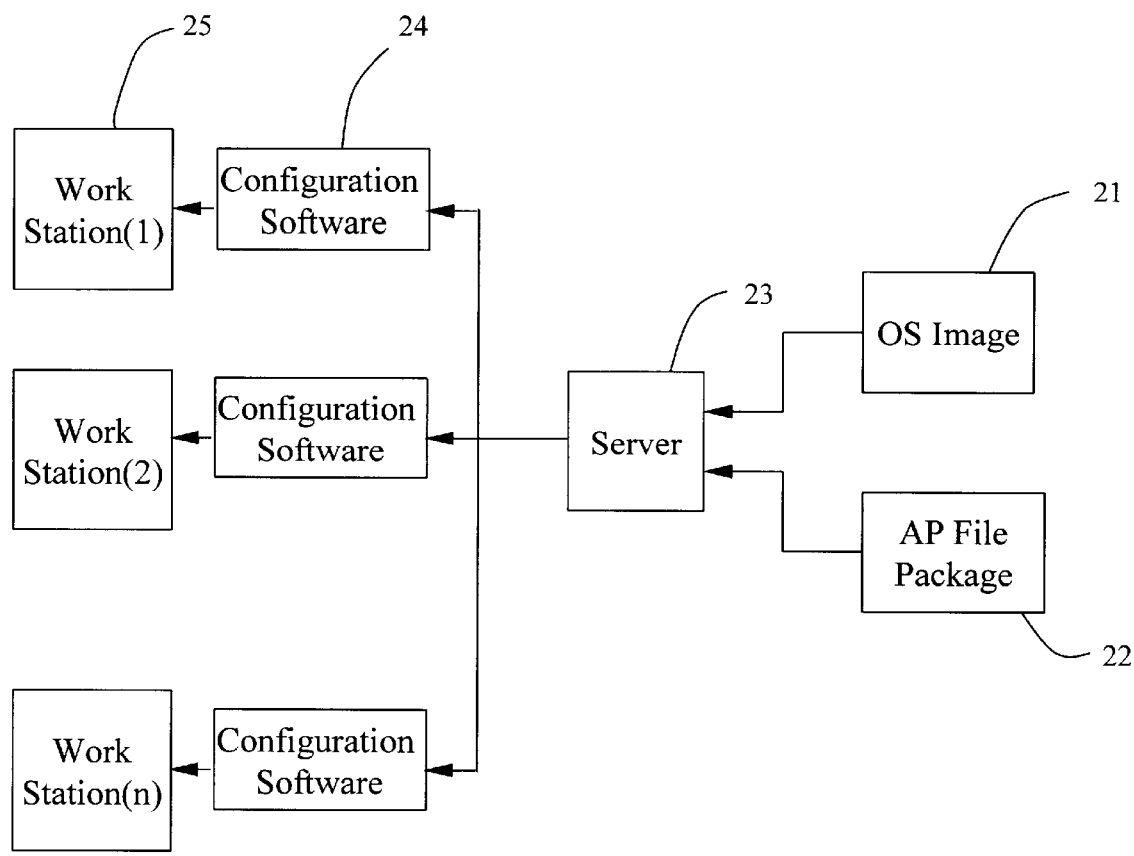
FIG. 2 illustrates a functional block diagram of the software pre-install method.

FIG. 2 is the functional block diagram of the present invention. At step 21, the image file is created for the hard disk drive where the operating system is stored. At step 22, the file package of the installed application program is created. Then the result of step 21 and step 22 is transmitted at the step 23. At step 24, the server picks up the selected software according to the content of the configuration file and, at step 25, transmits the selected software to the workstation to pre-install the software.

Figure 3:
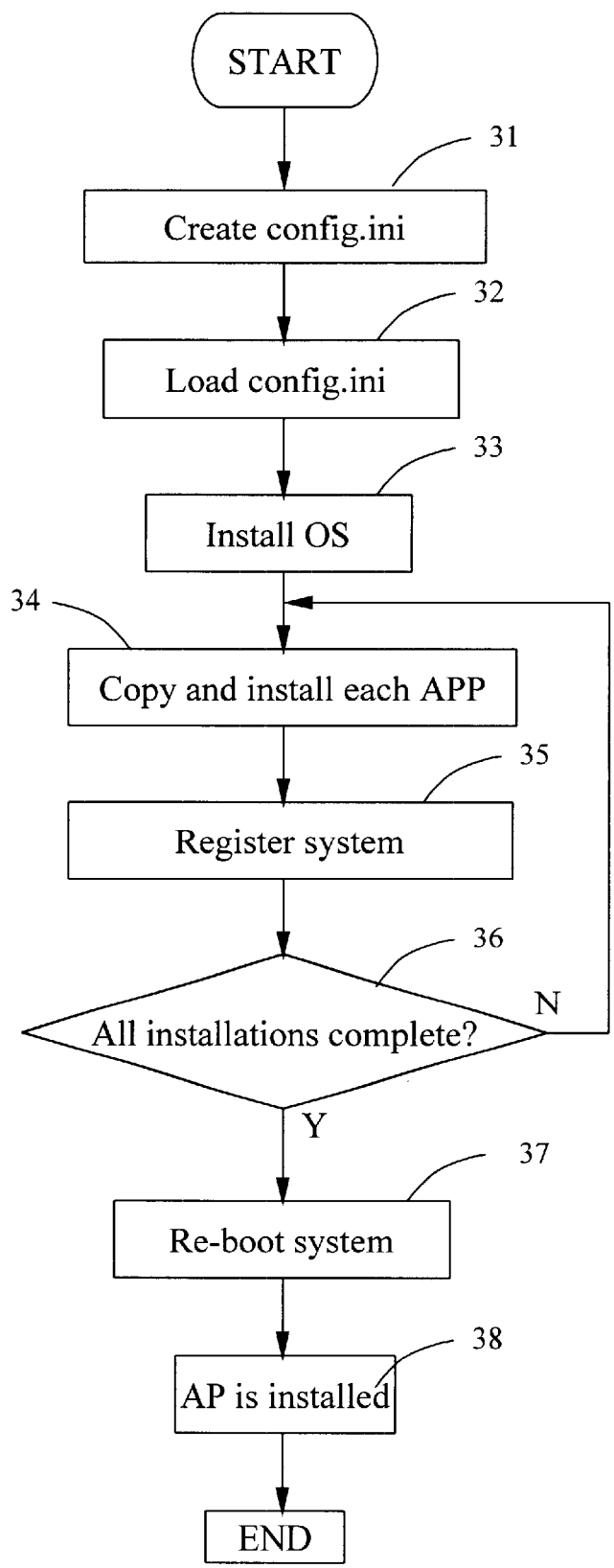
FIG. 3 shows a flow chart of the preferred embodiment of the present invention.

Please refer to FIG. 3, the flow chart of the preferred embodiment of the invention. The configuration file is created first at step 31 for pre-installing the software program. The server then read he configuration file at step 32 for transmitting the selected software to the destination workstation. The operating system is installed by the image file method at step 33, then each APP file package is copied and installed at step 34. After then, at step 35, the system registration is completed for each application program. If the installations of all the application programs are not completed, at step 36, then the step 34 is proceeded. If the installations are completed, the system is rebooted at step 37. The application programs will be automatically installed after boot up successfully at step 38.

Figure 4:
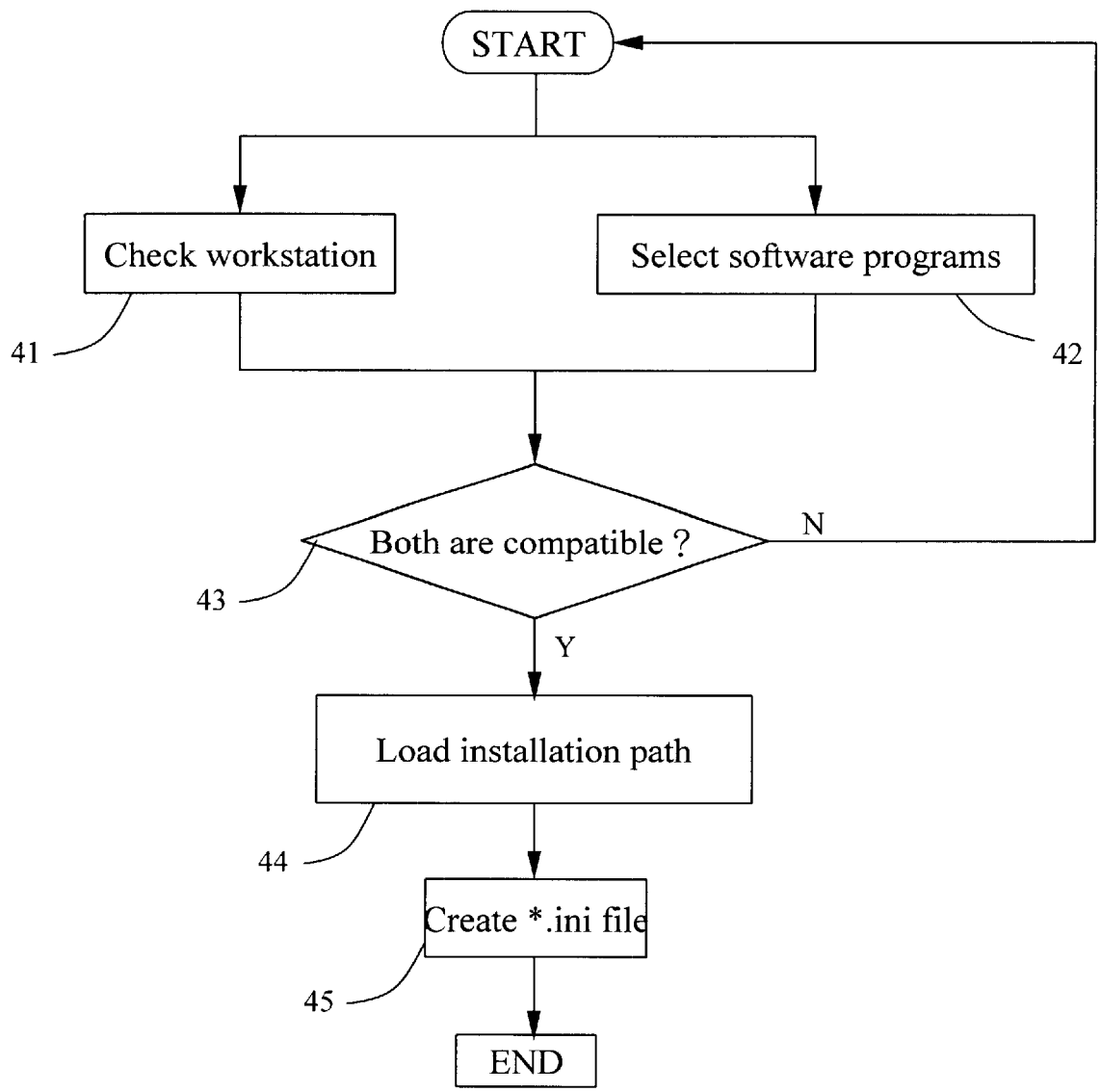
FIG. 4 illustrates the procedures of making the configuration file.
Figure 5:
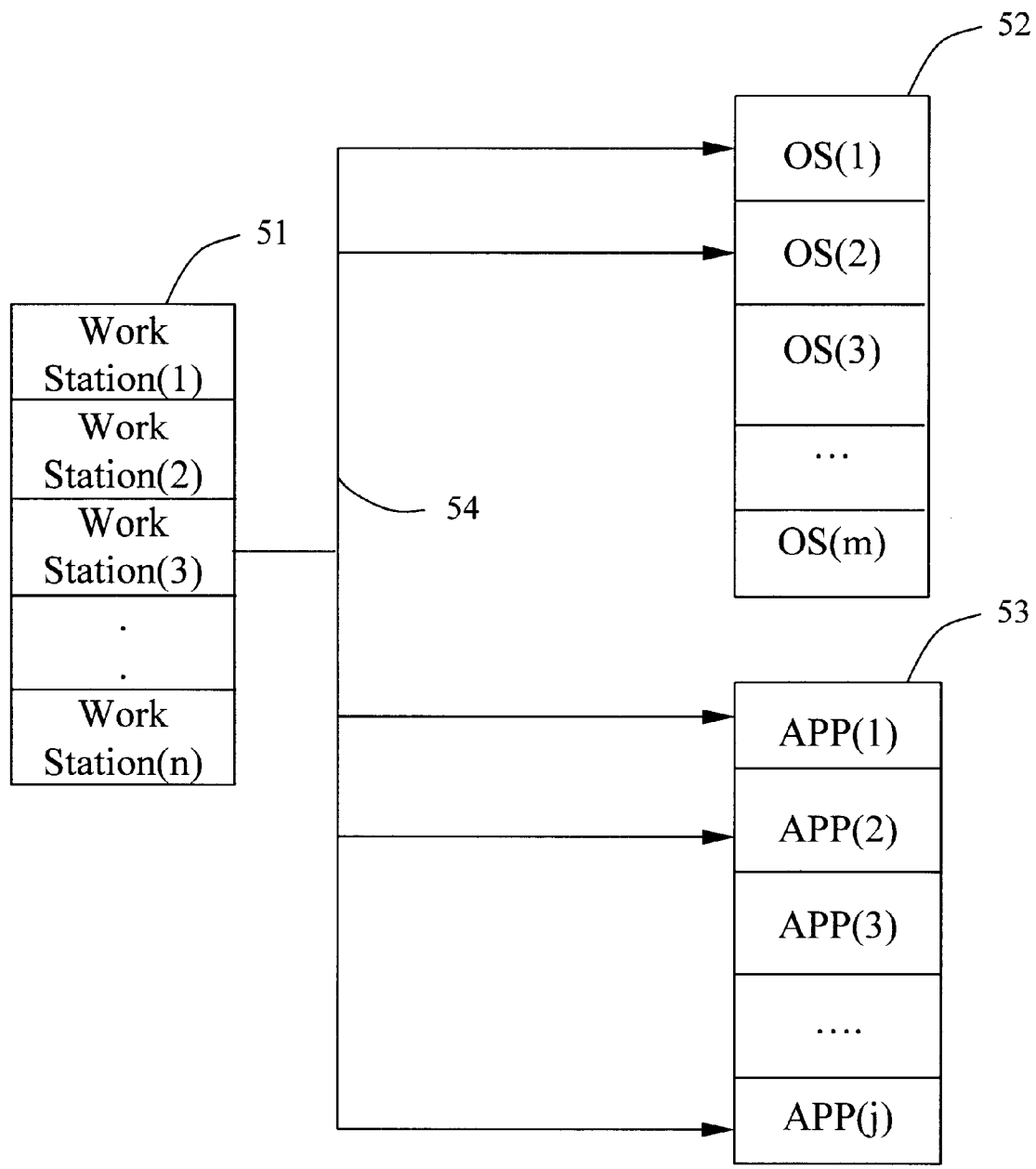
FIG. 5 shows the format of the configuration file.

The creation of configuration file is illustrated at FIG. 4. First, the position and status of the destination workstation for pre-installing software are checked at step 41. At step 42, the combination of software programs is decided. At the next step, step 43, if the destination workstation and the software that will be pre-installed are not compatible, then back to the step 41. If they are compatible, the step 44 is then proceeded to read addresses of the selected software programs. Using the data, an initialization file (***.ini) is created at step 45. The format of the configuration files is shown in the FIG. 5. In the table of workstation list 51, there are the path data 54 pointed to the operation systems 52 and application programs 53. As a result, when the server reads and resolves the configuration files, the selected programs are then transmitted to the destination workstation.

The OS image file is created from the source disk drive where the selected operating system is installed beforehand. Because the image file method is like the DOS command, DISKCOPY, the status of the source drive is copied identically onto the destination disk drive. If the source drive is a hard disk of one gigabyte, the destination drive is identical to a hard disk of one gigabyte after imaging, no matter what volume it is before.

The cause of the problem above is the file allocation table (FAT) format. In general speaking, storing a software program on a disk means to make the file of the program occupy some disk space. To read the programs conveniently, the allocations of the program need to be labeled. These labels are contained in the FAT. In consequence, FAT is like the library index which records the books in every location. The problem of reduced volume in the destination disk drive after imaging is caused by that different disk drives have different FAT. For example, there is a disk drive which volume is one gigabyte containing an operating system occupying one hundred megabyte. The operating system program should occupy 1% of the disk drive, so there will be 1% of the FAT left for recording this operating system. Similarly, if we install the operating system in a destination disk drive of two gigabyte, it should cost 0.5% of the space both in the disk drive and the FAT. However, it is not the case if we adopt the image file method to copy the source drive data to the destination disk drive. In the FAT of the destination disk drive, it costs 1% to record the operating system just as it does in the FAT of the source disk drive. At the same time, the volume of destination disk is restricted in one gigabyte but not in the original two gigabyte. For recovering from the drawback, the FAT table is resolved first in the embodiment of the invention. After the offset of the non-zero valid term to the FAT first term is calculated, the FAT in the source drive is transformed into another image file compatible with volume of the destination disk drive.

The other way to solve the problem is to adopt the method only in the same volume disk drives. However, if there are different sizes of disk drives needed, different kinds of source disk drives need to be prepared first which cost extra space and time.

Figure 6:
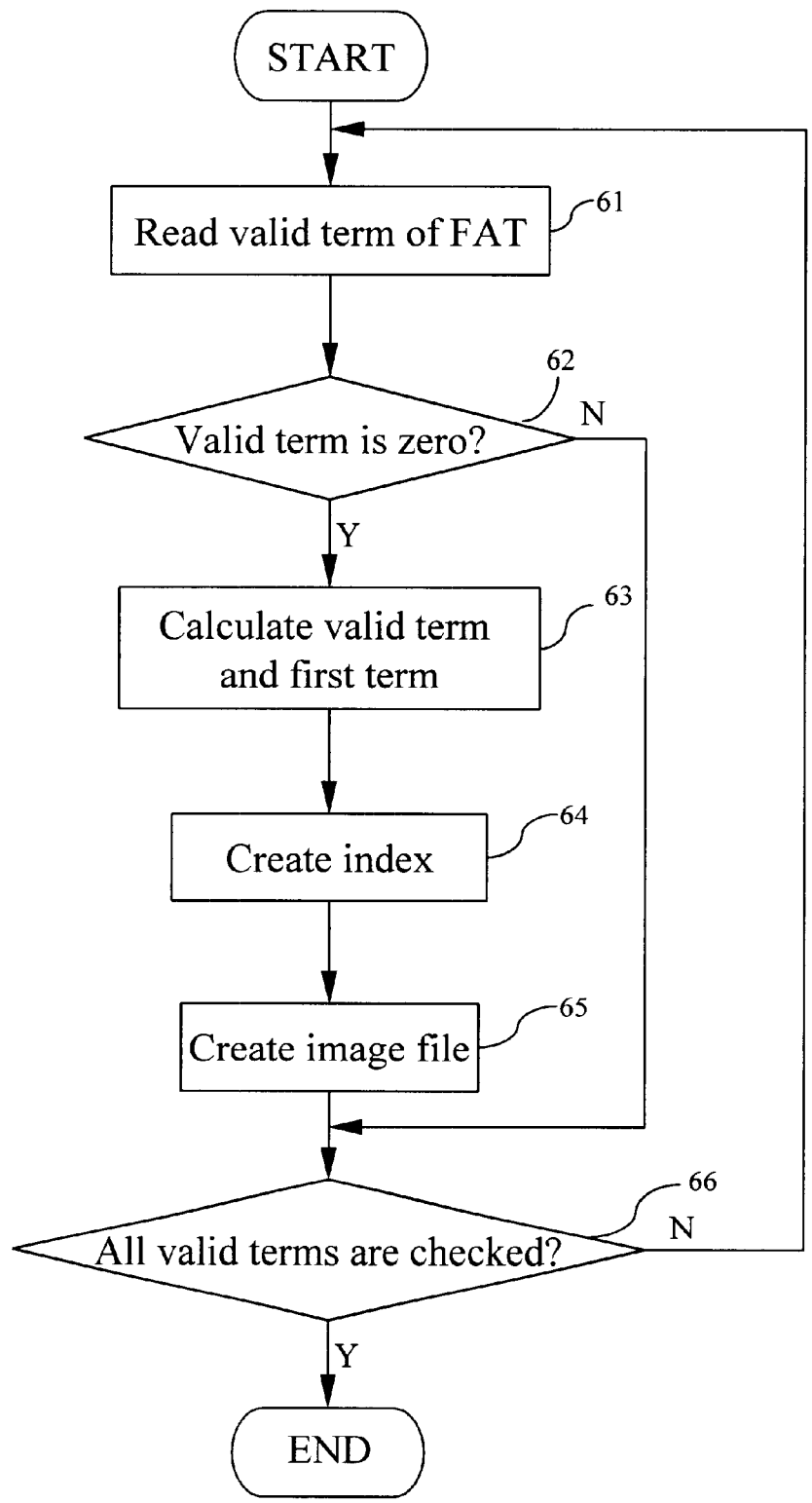
FIG. 6 is the resolving procedure of the file allocation table, FAT, of the operating system.

The resolving procedure of FAT for the operating system is shown in the FIG. 6. First, the valid term of FAT is read at step 61 to determine whether the term is zero or not at step 62. If it is non-zero, the offset of the valid term address and first term address is calculated at step 63. Then the index is creating from the offset of the valid time at step 64, and the image file is created at step 65. After then, at step 66, if not all the valid terms of the FAT are checked, the process continues to resolve the FAT and back to step 61. The process continues until all the valid terms of the FAT are checked. During the installation process, the hardware to be installed is checked according to the configuration file. After the OS image file is loaded, the hardware is automatically partitioned and formatted. The data are written into the hardware in number of the logical cluster.

The application programs are installed in the similar way that the application programs are stored in the hard disk according to the configuration file. The APP file package is sent by the LAN and copied into corresponding location in the demand of the configuration file. After then the registration is done by interacted mode or by batch mode. If the batch mode is adopted, it will be efficient because the user may not spend time for selecting the installation items.

It is noted that method for pre-installing software programs described above are the preferred embodiments of the present invention for the purposes of illustration only, and are not intended as a definition of the limits and scope of the invention disclosed. Any modifications and variations that may be apparent to a person skilled in the art are intended to be included within the scope of the present invention.

What is claimed is:

1. A method for pre-installing software programs into a hardware, comprising the steps of:

creating at least one configuration file relating to an operating system and a plural of application programs;

creating an image file of the operating system;

mapping the image file to the hardware;

copying the application programs to the hardware; and re-booting the hardware;

wherein the step of creating the image file further comprises the following sub-steps:

loading valid terms of the file allocation table sequentially;

checking if the valid terms are zero or not;

calculating offsets between the valid term address and first term address;

creating an index;

compressing and creating the image file; and checking if all the valid terms in the file allocation table are processed.

2. The method for pre-installing software programs as recited in claim 1, wherein the step of creating the configuration file further comprises:

checking the position and status of the hardware;

selecting a desired combination of software programs;

determining the compatibility of the software and the hardware; and reading the addresses of the software program.

3. The method for pre-installing software programs as recited in claim 1 wherein the configuration file includes a hardware path, an operating system path and a software program path.

4. The method for pre-installing software programs as recited in claim 1 wherein the step of mapping the image file to the hardware further comprises:

verifying the hardware according to the demand of the configuration file;

loading the operating system image file; and creating the hardware partition and format.

5. The method for pre-installing software programs as recited in claim 1 wherein the step of copying the software program selected by the configuration file to the hardware further comprises:

copying the application file package through the local area network to a corresponding position in the hardware on demand of the configuration file; and copying the system registration of the application program.

6. The method for pre-installing software programs as recited in claim 1 wherein the step of copying the software program selected by the configuration file to the hardware further comprises:

copying the application file package through the local area network to a corresponding position in the hardware on demand of the configuration file; and installing the application program by batch mode, which installs basic items of program without selecting items by users.

7. A method for installing software through the local area network comprising the following steps:

creating an image file of a hard disk drive which consists of an operating system;

creating a file package after an application program is installed in the hard disk drive;

transmitting the image file and the file package to a server;

making the server decide the software program selected by a configuration file; and transmitting the selected application program to a workstation for pre-installation;

wherein the step of creating the image file comprises the following sub-steps:

loading valid terms of the file allocation table sequentially;

determining whether the valid terms are zero or not;

calculating offsets between the valid term address and first term address;

creating an index;

compressing and creating the image file; and determining whether all the valid terms in the file allocation table are processed.

8. The method for installing software through the local area network as recited in claim 7 wherein the step of creating the configuration file further comprises:

determining the position and status of the hardware;

selecting a combination of software programs;

determining the compatibility of the hardware and the software; and loading the address of the software.

9. The method for installing software through the local area network as recited in claim 7 wherein the configuration file includes a hardware path, an operating system path and a software program path.

* * * * *